US011988021B2

(12) United States Patent
Qiu

(10) Patent No.: US 11,988,021 B2
(45) Date of Patent: May 21, 2024

(54) MINIATURE SMART LOCK WITH ANTI-PRIZING FUNCTION

(71) Applicant: SHANGHAI SHANMAI ELECTRONIC TECHNOLOGY DEVELOPMENT CO., LTD., Shanghai (CN)

(72) Inventor: Lili Qiu, Shanghai (CN)

(73) Assignee: Shanghai Shanmai Electronic Technology Development Co., Ltd., Shanghai (CN)

(*) Notice: Subject to any disclaimer, the term of this patent is extended or adjusted under 35 U.S.C. 154(b) by 322 days.

(21) Appl. No.: 17/607,793

(22) PCT Filed: Mar. 17, 2020

(86) PCT No.: PCT/CN2020/079688
§ 371 (c)(1),
(2) Date: Oct. 29, 2021

(87) PCT Pub. No.: WO2021/027282
PCT Pub. Date: Feb. 18, 2021

(65) Prior Publication Data

US 2022/0220776 A1 Jul. 14, 2022

(30) Foreign Application Priority Data

Aug. 13, 2019 (CN) ......................... 201910743235.2

(51) Int. Cl.
*E05B 47/02* (2006.01)
*E05B 47/00* (2006.01)

(52) U.S. Cl.
CPC ........ *E05B 47/026* (2013.01); *E05B 47/0004* (2013.01); *E05B 2047/0016* (2013.01); *E05B 2047/0037* (2013.01)

(58) Field of Classification Search
CPC .... E05B 47/026; E05B 47/0004; E05B 17/20; E05B 17/2003; E05B 17/2007;
(Continued)

(56) References Cited

U.S. PATENT DOCUMENTS 4,387,582 A * 6/1983 Meunier ........... B60R 25/02126 70/252
4,691,542 A * 9/1987 Young ................. E05B 47/0002 292/144
(Continued)

FOREIGN PATENT DOCUMENTS

CN 2560713 Y 7/2003
CN 201087614 Y 7/2008
(Continued)

OTHER PUBLICATIONS

International Search Report dated Jun. 11, 2020 for Parent PCT Appl. No. PCT/CN2020/079688.

*Primary Examiner* — Kristina R Fulton
*Assistant Examiner* — Emily G. Brown
(74) *Attorney, Agent, or Firm* — James E. Walton

(57) ABSTRACT

A miniature smart lock comprises a lock shell, and a magnetic rod, a push head, a bolt, a V-shaped push rod, an anti-prising guide slot, and a positioning guide pin, which are mounted in the lock shell, wherein a magnetic coil is mounted surrounding an outer portion of the magnetic rod; a magnetic rod spring is mounted on the magnetic rod on the left side of the magnetic coil; the push head is mounted at the right end of the magnetic rod; the V-shaped push rod is connected to the right end of the push head via a V-shaped push rod connection pin; and the V-shaped push rod is movably connected to the bolt via an anti-prising pin.

4 Claims, 1 Drawing Sheet

(58) Field of Classification Search
CPC ............. E05B 17/2049; E05B 17/2061; E05B 17/2069; E05B 17/2084; E05B 17/2088
See application file for complete search history.

(56) References Cited

U.S. PATENT DOCUMENTS

| | | | | | |
|---|---|---|---|---|---|
| 5,246,258 | A * | 9/1993 | Kerschenbaum | E05B 47/0002 | 70/279.1 |
| 2006/0042334 | A1 * | 3/2006 | Huang | E05B 47/0002 | 70/279.1 |
| 2007/0096475 | A1 * | 5/2007 | Raatikainen | E05B 63/20 | 292/137 |

FOREIGN PATENT DOCUMENTS

| | | | |
|---|---|---|---|
| CN | 202520087 | U | 11/2012 |
| CN | 110273591 | A | 9/2019 |
| CN | 209891869 | U | 1/2020 |
| DE | 3202878 | A1 | 8/1983 |
| EP | 0110835 | A2 | 6/1984 |

* cited by examiner

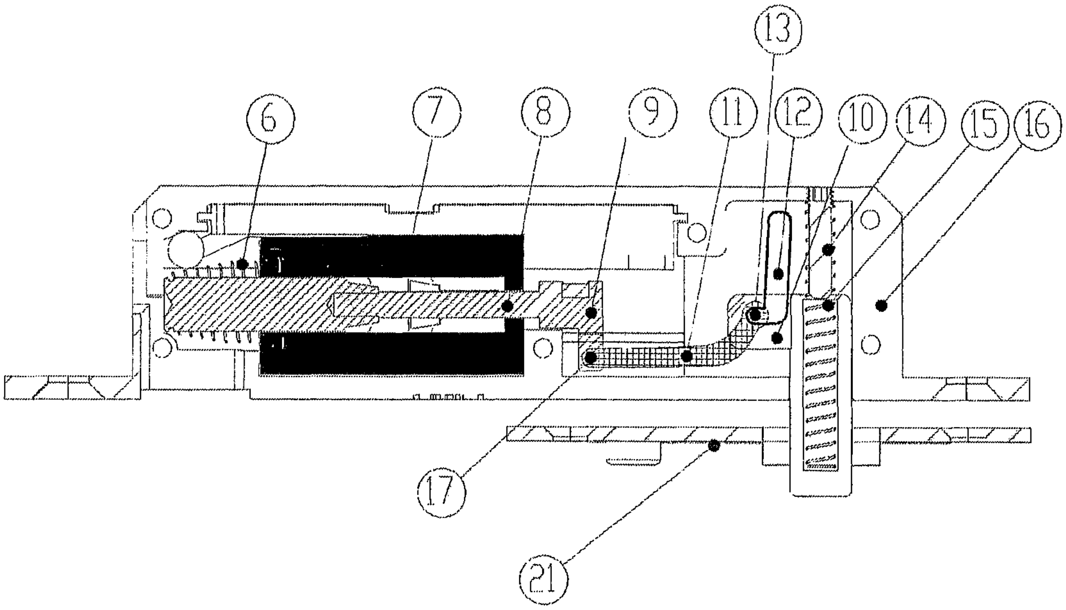
6
7
8
9
11
12
13
10
14
15
16
17
21

MINIATURE SMART LOCK WITH ANTI-PRIZING FUNCTION

This application is a 35 U.S.C. § 371 National-Stage application based upon PCT/CN2020/079688, filed 17 Mar. 2020, which claims priority to Chinese Patent Application No. 2019107432352, titled "Single-Power Miniature Smart Lock", filed 13 Aug. 2019, both of which are incorporated herein by reference for all purposes.

TECHNICAL FIELD

The present invention relates to a lock, in particular to a miniature smart lock with an anti-prizing function.

BACKGROUND

With continuous development of science and technology, intelligence and security has become the subject of research. In particular, how to improve the security of cabinet doors of dedicated counters, showcases, and show windows in the retail industry as well as smart home equipment has become a subject of eager research. Compared with traditional mechanical locks, electronic locks are more convenient to use, and have been greatly improved both in technic and performance, and have become more and more popular in recent years.

However, the traditional electronic locks are large in size and are not suitable for mounting environment of small objects, and in course of actual use, the rack and pinion mechanisms of the traditional electronic locks will be affected by complex physical and chemical reactions produced by dust and moisture accumulated in the operating space for a long time when the temperature changes. In addition, the traditional electronic locks have poor anti-prizing performance, which poses a financial safety hazard to users.

SUMMARY

An objective of the present invention is to provide a miniature smart lock with an anti-prizing function, which has a simple structure and is safe and reliable, so as to solve the above-mentioned problem proposed in the background art.

In order to achieve the above objective, the present invention provides the following technical solution:

A miniature smart lock with an anti-prizing function, including a lock shell, and a magnetic rod, a push head, a bolt, a V-shaped push rod, an anti-prizing guide slot, and a positioning guide pin, which are mounted in the lock shell, wherein a magnetic coil is mounted surrounding an outer portion of the magnetic rod, a magnetic rod spring is mounted on the magnetic rod on the left side of the magnetic coil, the push head is mounted at the right end of the magnetic rod, the V-shaped push rod is connected to the right end of the push head by means of a V-shaped push rod connection pin, the V-shaped push rod is movably connected to the bolt by means of an anti-prizing pin, and an end of the anti-prizing pin, which passes through the V-shape push rod and the bolt, is arranged within the anti-prizing guide slot, the positioning guide pin is connected to the right side of the bolt, and a return spring connected with the lock shell is mounted at the lower part of the positioning guide pin.

Preferably, the anti-prizing guide slot is V-shaped.

Preferably, the bottom lateral slot of the anti-prizing guide slot is parallel to the bottom of the lock shell, and the longitudinal slot extends towards the top of the lock shell in an inclined line.

Preferably, a lock catch plate is mounted at the bottom of the lock shell.

Preferably, the net size of the lock shell is 50 mm to 145 mm in length, 14 mm to 28 mm in height, and 14 mm to 20 mm in width.

Compared with the prior art, the beneficial effects of the present invention are:

- the present invention is small in terms of size and has a simple structure, and is not restricted by the mounting environment; electromagnetic driving is used such that the lock is unlocked when power is on and is locked when power is off, thus the lock is not affected by changes in temperature and is safe and durable; in addition, with the clever design of the positioning guide pin and the anti-prizing guide slot, the positioning guide pin is located at the far left of a horizontal portion of the anti-prizing guide slot during power-off locking, such that the bolt cannot be directly lifted up for unlocking, thereby achieving the effect of being anti-prizing and being safe and reliable.

BRIEF DESCRIPTION OF THE DRAWINGS

The FIGURE is a schematic diagram of the structure of the present invention.

In the FIGURE: 6—magnetic rod spring; 7—magnetic coil; 8—magnetic rod; 9—push head; 10—bolt; 11—V-shaped push rod; 12—anti-prizing guide slot; 13—anti-prizing pin; 14—positioning guide pin; 15—return spring; 16—lock shell; 17—V-shaped push rod connection pin; 21—lock catch plate.

DETAILED DESCRIPTION

The technical solution of the present patent will be described in further detail below in conjunction with a specific embodiment.

Please refer to FIG. 1, a miniature smart lock with an anti-prizing function includes a lock shell 16, and a magnetic rod 8, a push head 9, a bolt 10, a V-shaped push rod 11, an anti-prizing guide slot 12, and a positioning guide pin 14, which are mounted in the lock shell 16. The net size of the lock shell 16 is 50 mm to 145 mm in length, 14 mm to 28 mm in height, and 14 mm to 20 mm in width. A lock catch plate 21 is mounted at the bottom of the lock shell 16. A magnetic coil 7 is mounted surrounding an outer portion of the magnetic rod 8, a magnetic rod spring 6 is mounted on the magnetic rod 8 on the left side of the magnetic coil 7, and the push head 9 is mounted at the right end of the magnetic rod 8. The V-shaped push rod 11 is connected to the right end of the push head by means of a V-shaped push rod connection pin 17, the V-shaped push rod 11 is movably connected to the bolt 10 by means of an anti-prizing pin 13, and an end of the anti-prizing pin 13, which passes through the V-shape push rod 11 and the bolt 10, is arranged within the anti-prizing guide slot 12. The anti-prizing guide slot 12 is V-shaped, the bottom lateral slot of the anti-prizing guide slot 12 is parallel to the bottom of the lock shell, and the longitudinal slot of the anti-prizing guide slot 12 extends towards the top of the lock shell in an inclined line. The positioning guide pin 14 is connected to the right side of the bolt 10, and a return spring 15 connected with the lock shell 16 is mounted at the lower part of the positioning guide pin 14.

The working principle of the miniature smart lock with an anti-prizing function is as follows.

When the miniature smart lock is unlocked, the magnetic coil 7 is powered on by a DC 8V to 12V power supply to generate a magnetic field and make the magnetic rod 8 move to the right, and the push head 9 is linked to push the V-shaped push rod 11, thereby through the V-shaped push rod, driving the anti-prizing pin 13 first to slide to the right horizontally to the far right within the anti-prizing guide slot 12, and then to move upward along the inclined line part of the anti-prizing guide slot 12, and at the same time to drive the bolt 10 to lift up. The power-on time of the magnetic coil 7 is 1 second to 6 seconds (which can be adjusted by the related control software). If the energizing of the magnetic coil 7 ends, the magnetic field of the magnetic coil 7 disappears, and the bolt 10 is moved downward through the return spring 15, and the anti-prizing pin 13 is driven to move downward along the vertical part of the anti-prizing guide slot 12 until the bolt 10 is reset and locked, and while the return spring 15 moves, the magnetic rod spring 6 drives the magnetic rod 8 and the push head 9 and links the V-shaped push rod 11 to move to the left, and at the same time the V-shaped push rod 11 drives the anti-prizing pin 13 to move to the left in the horizontal part of the anti-prizing guide slot 12 to the far left, that is, the anti-prizing pin 13 is reset; after the anti-prizing pin 13 is reset, the bolt 10 cannot be directly lifted upwards, so that the anti-prizing function of the bolt is achieved.

A preferred embodiment of the present patent has been described in detail above, but the present patent is not limited to the above embodiment and within the scope of knowledge possessed by those of ordinary skill in the art, it is also possible to make various variations without departing from the gist of the present patent.

What is claimed is:

1. A miniature smart lock with an anti-prising function, comprising:

a lock shell; and a magnetic rod;

a push head;

a bolt;

a V-shaped push rod;

an anti-prising guide slot; and a positioning guide pin, each of which is mounted in the lock shell;

wherein a magnetic coil is mounted surrounding an outer portion of the magnetic rod, a magnetic rod spring is mounted on the magnetic rod on a left side of the magnetic coil, the push head is mounted at a right end of the magnetic rod, the V-shaped push rod is connected to a right end of the push head via a V-shaped push rod connection pin, the V-shaped push rod is movably connected to the bolt via an anti-prising pin, an end of the anti-prising pin, which passes through the V-shaped push rod and the bolt, is arranged within the anti-prising guide slot, the anti-prizing guide slot comprises a bottom lateral slot and a longitudinal slot, the bottom lateral slot is parallel to a bottom of the lock shell and the longitudinal slot extends towards a top of the lock shell in an inclined line, the positioning guide pin is connected to a right side of the bolt, and a return spring connected with the lock shell is mounted at a lower part of the positioning guide pin;

wherein when the magnetic coil is powered on to generate a magnetic field, the magnetic rod moves to the right, the push head is linked to push the V-shaped push rod to drive the anti-prizing pin first to slide to the right horizontally to the far right along the bottom lateral slot and then to move Upward along the longitudinal slot, to drive the bolt to lift up; when energizing of the magnetic coil ends, the bolt is moved downward through the return spring, and the anti-prizing pin is driven to move downward along the longitudinal slot until the bolt is locked, and while the return spring moves, the magnetic rod spring drives the magnetic rod and the push head and links the V-shaped push rod to move to the left, and the V-shaped push rod drives the anti-prizing pin to move to the left along the bottom lateral slot to the far left so that the bolt cannot be lifted upwards.

2. The miniature smart lock with an anti-prising function according to claim 1, wherein the anti-prising guide slot is V-shaped.

3. The miniature smart lock with an anti-prising function according to claim 1, wherein a lock catch plate is mounted at a bottom of the lock shell.

4. The miniature smart lock with an anti-prising function according to claim 1, wherein the net size of the lock shell is 50 mm to 145 mm in length, 14 mm to 28 mm in height, and 14 mm to 20 mm in width.

* * * * *